United States Patent
Jeon

(10) Patent No.: US 11,805,407 B2
(45) Date of Patent: Oct. 31, 2023

(54) APPARATUS AND METHOD FOR SECURELY UPDATING BINARY DATA IN VEHICLE

(71) Applicant: HYUNDAI MOBIS CO., LTD., Seoul (KR)

(72) Inventor: Byeong Hwan Jeon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 296 days.

(21) Appl. No.: 16/844,776

(22) Filed: Apr. 9, 2020

(65) Prior Publication Data
US 2020/0329371 A1    Oct. 15, 2020

(30) Foreign Application Priority Data
Apr. 10, 2019   (KR) .................. 10-2019-0041990

(51) Int. Cl.
*H04W 12/03* (2021.01)
*G06F 16/23* (2019.01)
(Continued)

(52) U.S. Cl.
CPC ........ *H04W 12/03* (2021.01); *G06F 16/2365* (2019.01); *G06F 16/2379* (2019.01);
(Continued)

(58) Field of Classification Search
CPC ....... H04W 12/03; H04W 4/46; H04W 12/10; H04W 12/35; H04W 4/40; G06F 8/65;
(Continued)

(56) References Cited

U.S. PATENT DOCUMENTS 7,966,111 B2 * 6/2011 Moinzadeh ............. B60R 25/00
                                                                    455/418
8,136,108 B2 * 3/2012 Ha ...................... G06F 11/1433
                                                                    717/176
(Continued)

FOREIGN PATENT DOCUMENTS

KR    10-2004-0036771 A    5/2004

OTHER PUBLICATIONS

Nilsson, Secure Firmware Updates over the Air in Intelligent Vehicles, IEEE, 2008.*
(Continued)

*Primary Examiner* — David Garcia Cervetti
(74) *Attorney, Agent, or Firm* — DLA PIPER LLP (US)

(57) ABSTRACT

The apparatus for securely updating the binary data in the vehicle includes a plurality of nodes that transmit/receive block data to/from each other through a wireless network. Each of the plurality of nodes includes a data reception unit that receives block data from another node, a data verification unit that compares the block data received from the another node with previously stored block data, a data correction unit that deletes the block data, or combines the block data with the previously stored block data and encrypts the combined block data to generate corrected block data, a data storage unit that stores the corrected block data, and a data transmission unit that transmits the corrected block data to another node.

8 Claims, 2 Drawing Sheets

(51) Int. Cl.
  *G07C 5/08* (2006.01)
  *G07C 5/00* (2006.01)
  *H04W 12/10* (2021.01)
  *H04L 9/06* (2006.01)
  *H04L 9/40* (2022.01)
  *H04L 9/00* (2022.01)

(52) U.S. Cl.
  CPC ............. *G07C 5/008* (2013.01); *G07C 5/085* (2013.01); *H04L 9/0618* (2013.01); *H04L 63/123* (2013.01); *H04W 12/10* (2013.01); *H04L 9/50* (2022.05); *H04L 2209/80* (2013.01); *H04L 2209/84* (2013.01)

(58) Field of Classification Search
  CPC ............. G06F 16/2365; G06F 16/2379; G06F 21/572; G07C 5/008; G07C 5/085; H04L 9/0618; H04L 63/123; H04L 67/34; H04L 9/50; H04L 2209/80; H04L 2209/84; H04L 9/3239; H04L 63/0428; H04L 9/06
  See application file for complete search history.

(56) References Cited

U.S. PATENT DOCUMENTS

| | | | | |
|---|---|---|---|---|
| 8,391,775 | B2* | 3/2013 | Moinzadeh | G11B 27/105 455/3.06 |
| 8,676,135 | B2* | 3/2014 | Hong | G06Q 30/0601 455/99 |
| 8,789,035 | B2* | 7/2014 | McCarthy | G06F 8/65 717/172 |
| 8,831,823 | B2* | 9/2014 | Moinzadeh | H04M 1/72463 340/5.1 |
| 8,856,536 | B2* | 10/2014 | Rabadi | H04L 9/30 713/193 |
| 8,942,888 | B2* | 1/2015 | Garrett | G06F 17/00 340/426.2 |
| 8,966,248 | B2* | 2/2015 | Baltes | H04L 9/3247 713/176 |
| 9,002,574 | B2* | 4/2015 | Garrett | H04M 1/72463 340/426.2 |
| 9,063,816 | B2* | 6/2015 | Hobbet | G06F 8/65 |
| 9,104,538 | B2* | 8/2015 | Garrett | H04L 67/12 |
| 9,128,796 | B2* | 9/2015 | Chitre | G06F 8/65 |
| 9,141,370 | B1* | 9/2015 | Nay | G06F 8/61 |
| 9,370,029 | B2* | 6/2016 | O'Meara | H04L 67/56 |
| 9,430,225 | B2* | 8/2016 | Ko | G06F 8/658 |
| 9,524,160 | B2* | 12/2016 | Takahashi | G06F 13/00 |
| 9,542,406 | B1* | 1/2017 | Bourbonnais | G06F 16/2365 |
| 9,639,342 | B2* | 5/2017 | Kryzer | G06F 8/65 |
| 9,639,344 | B2* | 5/2017 | Rockwell | G06F 8/65 |
| 9,684,508 | B2* | 6/2017 | Oku | G06F 8/65 |
| 9,734,119 | B1* | 8/2017 | Chetverikov | G06F 13/4282 |
| 9,753,719 | B2* | 9/2017 | Hilliar | H04W 12/03 |
| 9,952,850 | B2* | 4/2018 | Joshi | G06F 11/1433 |
| 9,996,339 | B2* | 6/2018 | Agarwal | G06F 8/65 |
| 10,042,629 | B2* | 8/2018 | Sarkar | G06F 8/658 |
| 10,095,502 | B2* | 10/2018 | Chang | G06F 8/654 |
| 10,157,050 | B2* | 12/2018 | Kotani | G06F 11/1433 |
| 10,331,428 | B1 | 6/2019 | Zalpuri | G06F 8/654 |
| 10,358,116 | B1* | 7/2019 | Jayaraman | H04L 67/306 |
| 10,360,018 | B2* | 7/2019 | Komano | H04W 4/48 |
| 10,394,548 | B2* | 8/2019 | Fox | G06F 8/71 |
| 10,423,401 | B2* | 9/2019 | Tschache | G06F 9/44536 |
| 10,447,483 | B1* | 10/2019 | Su | H04L 9/3226 |
| 10,713,727 | B1* | 7/2020 | Floyd | G06Q 50/26 |
| 10,719,501 | B1* | 7/2020 | Leise | G06Q 40/00 |
| 10,747,721 | B2* | 8/2020 | Jang | G06F 16/1865 |
| 10,805,068 | B1* | 10/2020 | Leise | G06Q 40/08 |
| 10,824,759 | B1* | 11/2020 | Magerkurth | G06F 21/6209 |
| 10,861,015 | B1* | 12/2020 | Alt | G06Q 40/08 |
| 11,599,653 | B1* | 3/2023 | Magerkurth | H04L 9/0894 |
| 2003/0055552 | A1* | 3/2003 | Akins | F02D 41/266 701/114 |
| 2006/0106781 | A1* | 5/2006 | Mori | G06F 16/282 |
| 2011/0066838 | A1* | 3/2011 | Takayama | H04L 9/3236 713/2 |
| 2013/0262472 | A1* | 10/2013 | Watanabe | G06F 16/2255 707/747 |
| 2014/0343787 | A1* | 11/2014 | Mabuchi | H04L 67/12 701/31.7 |
| 2015/0172995 | A1* | 6/2015 | Delattre | H04L 45/70 370/218 |
| 2016/0044137 | A1* | 2/2016 | Nakazawa | H04L 67/02 709/203 |
| 2016/0080279 | A1* | 3/2016 | Tan | H04L 67/12 370/328 |
| 2016/0112201 | A1* | 4/2016 | Misawa | H04L 9/30 713/168 |
| 2016/0294790 | A1* | 10/2016 | Susan | H04W 12/126 |
| 2016/0321443 | A1* | 11/2016 | Ishibashi | G06F 21/45 |
| 2016/0350325 | A1* | 12/2016 | Wang | G06F 3/0619 |
| 2017/0011606 | A1* | 1/2017 | Ceccon | G06Q 20/18 |
| 2017/0138771 | A1* | 5/2017 | Kim | G01D 18/00 |
| 2017/0235970 | A1* | 8/2017 | Conner | G06F 16/2358 707/690 |
| 2017/0324558 | A1* | 11/2017 | Takemori | G06F 21/575 |
| 2017/0329599 | A1* | 11/2017 | Choi | A61B 6/563 |
| 2018/0145991 | A1* | 5/2018 | McCauley | H04L 9/0891 |
| 2018/0176229 | A1 | 6/2018 | Bathen et al. | |
| 2018/0225051 | A1* | 8/2018 | Vansa | G06F 16/273 |
| 2018/0245559 | A1* | 8/2018 | Kang | G07C 9/00174 |
| 2018/0329907 | A1* | 11/2018 | De Paris | G06F 16/2379 |
| 2019/0020468 | A1* | 1/2019 | Rosenoer | H04L 9/3242 |
| 2019/0079950 | A1* | 3/2019 | Ramabaja | H04L 9/3239 |
| 2019/0147065 | A1* | 5/2019 | Maeda | H04L 9/3239 380/37 |
| 2019/0155513 | A1* | 5/2019 | Maeda | G06F 3/0641 |
| 2019/0187971 | A1* | 6/2019 | Wang | H04W 12/06 |
| 2019/0193653 | A1* | 6/2019 | Nakamura | G06F 9/4893 |
| 2019/0213462 | A1* | 7/2019 | McDonald | G06K 19/06178 |
| 2019/0238555 | A1* | 8/2019 | Buffard | H04L 67/12 |
| 2019/0253253 | A1* | 8/2019 | Yang | G16H 10/60 |
| 2019/0294582 | A1* | 9/2019 | Zhu | H04L 67/1095 |
| 2019/0362683 | A1* | 11/2019 | Ikeda | G09G 3/3677 |
| 2020/0034458 | A1* | 1/2020 | Mehta | G06F 16/2255 |
| 2020/0036789 | A1* | 1/2020 | Mehta | G06F 16/27 |
| 2020/0073993 | A1* | 3/2020 | Mutreja | G06F 16/273 |
| 2020/0167339 | A1* | 5/2020 | Manevich | H04L 9/0643 |
| 2020/0204400 | A1* | 6/2020 | Skertic | H04L 9/3239 |
| 2020/0210623 | A1* | 7/2020 | Bueno | H04L 9/3239 |
| 2020/0233940 | A1* | 7/2020 | Edwards | H04L 9/0637 |
| 2020/0250201 | A1* | 8/2020 | Cantwell | H04L 41/145 |
| 2020/0259633 | A1* | 8/2020 | Gallagher-Lynch | H04L 67/12 |
| 2020/0293500 | A1* | 9/2020 | Patil | H04L 9/3239 |
| 2020/0387421 | A1* | 12/2020 | Domeki | G06F 11/0751 |
| 2020/0412525 | A1* | 12/2020 | Katsak | H04L 9/0637 |
| 2021/0004181 | A1* | 1/2021 | Lakshman | G06F 3/0608 |
| 2021/0157529 | A1* | 5/2021 | Sakurai | B60R 16/03 |
| 2021/0303384 | A1* | 9/2021 | Smaalders | G06F 11/366 |
| 2021/0367790 | A1* | 11/2021 | Zhuo | H04L 9/3247 |
| 2022/0224548 | A1* | 7/2022 | Mondello | H04L 9/3263 |

OTHER PUBLICATIONS

Jiang, A Secure Data Forwarding Scheme in Vehicular Named Data Networking, IEEE, 2018.*
Steger, An Efficient and Secure Automotive Wireless Software Update Framework, IEEE, 2017.*
Steger, M., Dorri, A., Kanhere, S.S., Römer, K., Jurdak, R., Karner, M. (2018). Secure Wireless Automotive Software Updates Using Blockchains: A Proof of Concept. In: Zachäus, C., Müller, B., Meyer, G. (eds) Advanced Microsystems for Automotive Applications 2017. Lecture Notes in Mobility. Springer, Cham.*
Zhang, Data Security Sharing and Storage Based on a Consortium Blockchain in a Vehicular Ad-hoc Network, IEEE, Jan. 2019.*
Chinese Office Action dated Aug. 5, 2023 issued in CN 202010275637.7.

* cited by examiner

APPARATUS AND METHOD FOR SECURELY UPDATING BINARY DATA IN VEHICLE

CROSS-REFERENCE TO RELATED APPLICATION

This application claims priority from and the benefit of Korean Patent Application No. 10-2019-0041990, filed on Apr. 10, 2019, which is hereby incorporated by reference for all purposes as if set forth herein.

BACKGROUND

Field

Exemplary embodiments of the present disclosure relate to an apparatus and a method for securely updating binary data in a vehicle through over-the-air activation (OTA) of the vehicle by using a private blockchain technology.

Discussion of the Background

Recently, as a vehicle system is connected to a communication network, the security of data on software installed in a vehicle has become an important issue. For example, when software installed in a smart car is upgraded using a wireless communication network, a method of upgrading the software in an OTA manner like a smart phone is discussing. In such a case, data security may be required to verify the integrity of data transmitted through the wireless communication network. However, when the wireless communication network has no reliability, it may be vulnerable to security.

The aforementioned background art is technology information possessed by the inventor for the derivation of the present disclosure or acquired in the derivation process of the present disclosure, and is not necessarily a publicly known technology disclosed to the general public before the application of the present disclosure.

Patent Literature 1: Korean Patent Application Laid-Open No. 10-2004-0036771.

SUMMARY

Various embodiments are directed to ensuring security and reliability of data transmitted to each vehicle when updating binary data through a vehicle OTA by using a private blockchain technology that allows only an authorized node to participate.

In an embodiment, an apparatus for securely updating binary data in a vehicle may include a plurality of nodes as vehicles configured to transmit/receive block data, which is obtained by encrypting the binary data in the vehicle with a blockchain, to/from each other through a network, wherein each of the plurality of nodes may include: a data reception unit configured to receive block data from another node; a data verification unit configured to compare the block data received from the another node with previously stored block data; a data correction unit configured to delete the block data received from the another node, or combine the block data received from the another node with the previously stored block data and encrypt the combined block data to generate corrected block data; a data storage unit configured to store the corrected block data generated by the data correction unit; and a data transmission unit configured to transmit the corrected block data stored in the data storage unit to another node.

Any one of the plurality of nodes may be an initial information provider that transmits initial block data to the another node when the vehicle is shipped.

Any one of the plurality of nodes may combine new block data generated due to a specific operation with the previously stored block data, encrypt and store the combined block data, and transmit the stored block data to an adjacent node, and the adjacent node of the plurality of nodes may delete the block data received from the node when the block data received from the node is older than the previously stored block data, and combine the block data received from the node with the previously stored block data, encrypt and store the combined block data, and transmit the stored block data to an adjacent node when the block data received from the node is newer than the previously stored block data.

In an embodiment, a method for securely updating binary data in a vehicle may include the steps of: receiving, by a data reception unit, block data from another node; comparing, by a data verification unit, the block data received from the another node with previously stored block data; deleting, by a data correction unit, the block data received from the another node, or combining the block data received from the another node with the previously stored block data and encrypting the combined block data to generate corrected block data; storing, by a data storage unit, the corrected block data generated by the data correction unit; and transmitting, by a data transmission unit, the corrected block data stored in the data storage unit to another node, the data reception unit, the data verification unit, the data correction unit, the data storage unit, and the data transmission unit being included in each of a plurality of nodes as vehicles that transmit/receive block data, which is obtained by encrypting the binary data in the vehicle with a blockchain, to/from each other through a network.

The method may further include the step of transmitting, by any one node as an initial information provider among the plurality of nodes, initial block data to the another node when the vehicle is shipped.

The method may further include the steps of combining, by any one of the plurality of nodes, new block data generated due to a specific operation with the previously stored block data, encrypting and storing the combined block data, and transmitting the stored block data to an adjacent node; and deleting, by the adjacent node of the plurality of nodes, the block data received from the node when the block data received from the node is older than the previously stored block data, and combining the block data received from the node with the previously stored block data, encrypting and storing the combined block data, and transmitting the stored block data to an adjacent node when the block data received from the node is newer than the previously stored block data.

In addition, other methods and other systems for implementing the present disclosure and computer programs for executing the methods may be further provided.

Other aspects, features, and advantages other than the above will be apparent from the following drawings, claims and detailed description of the disclosure.

According to the embodiments, it is possible to ensure the reliability of binary data transmitted. In the related art, when a network has no reliability, it was difficult to ensure the reliability of binary data transmitted. However, in the present embodiment, it is possible to ensure network reliability and independent binary data transmission reliability by using a blockchain technology.

Furthermore, it is possible to reduce data processing cost and transmission time. In the related art, the maintenance cost of a server for uploading, storing, and distributing binary data is required. However, when applying the present embodiment, it is possible to reduce server cost by storing data in distributed nodes, and to reduce data processing cost and transmission time by using a private blockchain technology, as compared with a public blockchain.

The effects of the present disclosure are not limited to those mentioned above and other unmentioned effects will be clearly understood by those skilled in the art from the following description.

DETAILED DESCRIPTION OF THE ILLUSTRATED EMBODIMENTS

Figure 1:
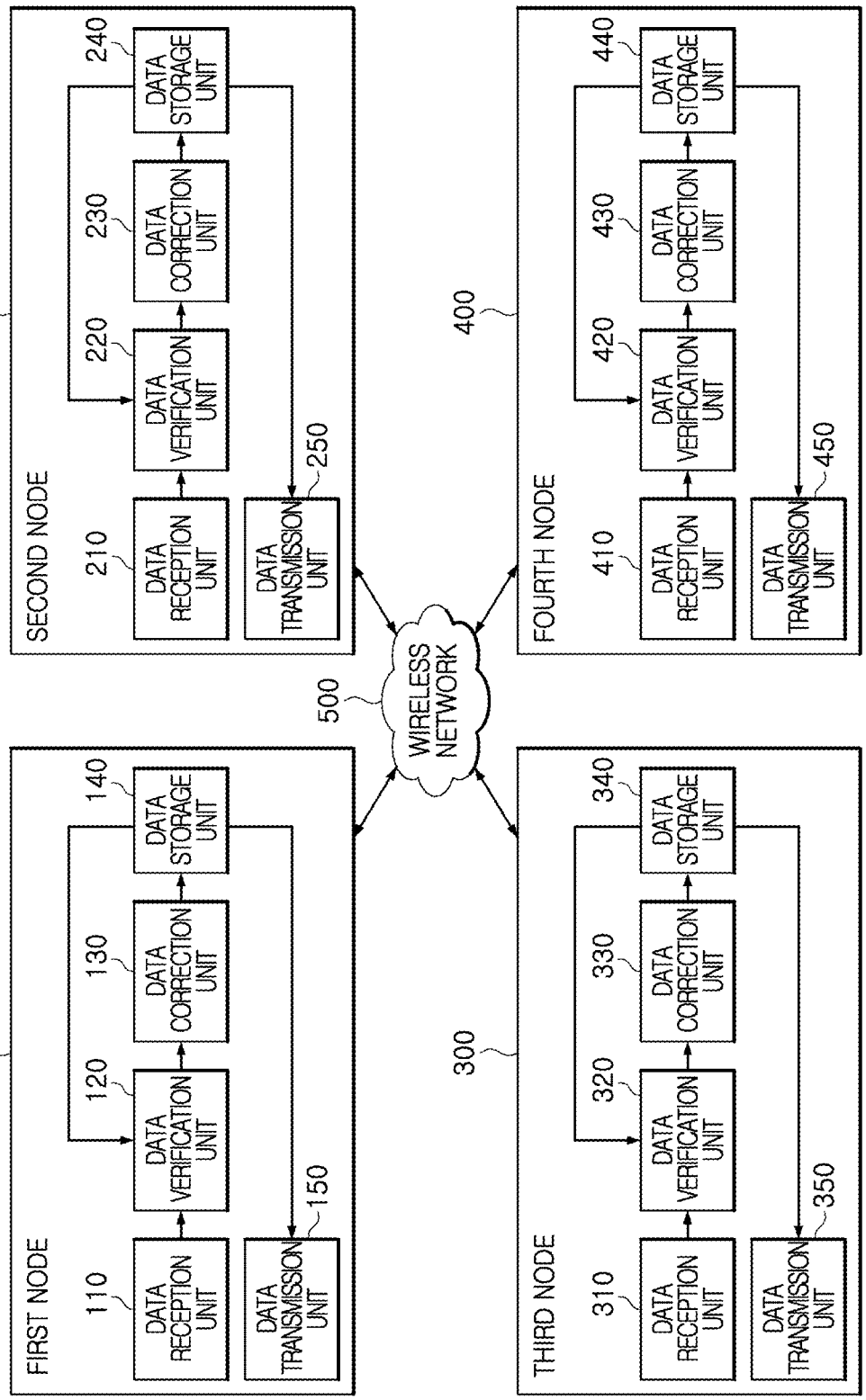
FIG. 1 is a diagram for schematically explaining an apparatus for securely updating binary data in a vehicle in accordance with an embodiment of the present disclosure.

The advantages and features of the present disclosure and methods for achieving them will become readily apparent by reference to the following detailed description when considered in conjunction with the accompanying drawings. However, the present disclosure is not limited to embodiments to be described below, may be realized in various forms, and should be construed to include all modifications, equivalents, and alternatives falling within the spirit and scope of the disclosure. The embodiments to be described below are provided to bring the disclosure of the present disclosure to perfection and assist those skilled in the art to completely understand the scope of the present disclosure in the technical field to which the present disclosure pertains. Detailed descriptions related to well-known functions or configurations will be ruled out in order not to unnecessarily obscure subject matters of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components, or combinations thereof, but do not preclude the presence or addition of one or more other features, integers, steps, operations, elements, components, or combinations thereof. The terms such as first and second may be used to describe various elements, but the elements are not limited by the terms, and the terms are used only to distinguish one element from another element.

Hereafter, embodiments in accordance with the present disclosure will be described in detail with reference to the accompanying drawings. In the description with reference to the accompanying drawings, same or corresponding elements are denoted by the same reference numerals and redundant description thereof will be omitted.

Throughout the specification, the term "blockchain" may refer to a distributed peer-to-peer (P2P) system of a ledger that utilizes a software element composed of algorithms in which blocks sequentially connected in order to ensure and maintain integrity negotiate service usage history information by using an encryption technique and a security technology. The distributed P2P system may be a special type of a distributed system. Furthermore, in the P2P system, all nodes in a network may provide resources (processing capacity, a storage space, data, a network bandwidth, and the like) to each other without coordination of a central node. Furthermore, the blockchain may refer to a distributed ledger technology in which the ledger recording the usage history information is distributed to a P2P network other than a central server of a specific institution and nodes in a network jointly record and maintain the ledger. Such a blockchain may be classified into a public blockchain that is open to everyone and a private blockchain that can be used only by participants who have permission in advance, and in the present embodiment, the private blockchain can be used.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

FIG. 1 is a diagram for schematically explaining an apparatus 1 for securely updating binary data in a vehicle in accordance with an embodiment of the present disclosure. Referring to FIG. 1, the apparatus 1 for securely updating binary data in a vehicle may include a first node 100, a second node 200, a third node 300, and a fourth node 400 as a plurality of nodes and a wireless network 500. In the present embodiment, the number of nodes is set to four, that is, the first node 100 to the fourth node 400; however, this is for convenience of description and the number of nodes may be increased.

In the present embodiment, each of the first node 100 to the fourth node 400 may include an arbitrary vehicle that intends to securely update binary data. The binary data may include firmware or software itself for operating each electronic control device (not illustrated) in the vehicle, or a directory including binary files related to the firmware, that is, complied binary files recognizable by a computer. Furthermore, any one of the first node 100 to the fourth node 400 may be an initial information provider that transmits initial block data obtained by encrypting initial binary data in a blockchain manner to another node when the vehicle is shipped.

Furthermore, each of the first node 100 to the fourth node 400 may transmit and receive block data to/from each other through the wireless network 500. The wireless network 500 may include a communication network that mutually connects the first node 100 to the fourth node 400 to support the transmission and reception of block data through the over-the-air activation (OTA) method.

The first node 100 may include a data reception unit 110, a data verification unit 120, a data correction unit 130, a data storage unit 140, and a data transmission unit 150. The second node 200 may include a data reception unit 210, a data verification unit 220, a data correction unit 230, a data storage unit 240, and a data transmission unit 250. The third node 300 may include a data reception unit 310, a data verification unit 320, a data correction unit 330, a data storage unit 340, and a data transmission unit 350. The fourth node 400 may include a data reception unit 410, a data verification unit 420, a data correction unit 430, a data storage unit 440, and a data transmission unit 450.

Each of the data reception units 110, 210, 310, and 410 may receive block data from other nodes. The other nodes may include one or more nodes adjacent to a corresponding node. For example, the data reception unit 110 included in the first node 100 may receive block data from one or more of the second node 200 to the fourth node 400. The data reception unit 210 included in the second node 200 may receive block data from one or more of the first node 100, the third node 300, and the fourth node 400. The data reception unit 310 included in the third node 300 may receive block data from one or more of the first node 100, the second node 200, and the fourth node 400. The data reception unit 410 included in the fourth node 400 may receive block data from one or more of the first node 100 to the third node 300.

The data verification units 120, 220, 320, and 420 may compare the block data received from the other nodes with block data previously stored in the data storage units 140, 240, 340, and 440, respectively. The data verification units 120, 220, 320, and 420 may compare tag information (for example, hash tag values) of the block data received from the other nodes with tag information of the block data previously stored in the data storage units 140, 240, 340, and 440, respectively. When there is a change in the tag information, each of the data verification units 120, 220, 320, and 420 may determine that the block data received from the other nodes is the latest information, and when there is no change in the tag information, each of the data verification units 120, 220, 320, and 420 may determine that the block data received from the other nodes is not the latest information.

As a selective embodiment, the data verification units 120, 220, 320, and 420 may compare the block data received from the other nodes with the block data previously stored in the data storage units 140, 240, 340, and 440, respectively. When no block data is stored in each of the data storage units 140, 240, 340, and 440, that is, when block data is first received from the other nodes, the data verification units 120, 220, 320, and 420 may store the block data received from the other nodes in the data storage units 140, 240, 340, and 440, respectively.

As a result of the comparison of each of the data verification units 120, 220, 320, and 420, when the block data received from the other nodes is not the latest information, each of the data correction units 130, 230, 330, and 430 may delete the block data received from the other nodes. When the block data received from the other nodes is the latest information, the data correction units 130, 230, 330, and 430 may combine the block data received from the other nodes with the block data previously stored in the data storage units 140, 240, 340, and 440, thereby generating encrypted corrected block data, respectively.

As an additional embodiment, when the previously stored block data is not the latest information, the data correction units 130, 230, 330, and 430 may determine that the block data is forgery block data and delete the block data previously stored in the data storage units 140, 240, 340, and 440, respectively. When the previously stored block data is the latest information, the data correction units 130, 230, 330, and 430 may determine that the block data is new block data and combine the block data received from the other nodes with the block data previously stored in the data storage units 140, 240, 340, and 440, thereby generating encrypted corrected block data and storing the generated block data in the data storage units 140, 240, 340, and 440, respectively.

Accordingly, block data may be periodically stored in each of the data storage units 140, 240, 340, and 440 as the latest information.

The data transmission units 150, 250, 350, and 450 may transmit the corrected block data stored in the data storage units 140, 240, 340, and 440 to other nodes, respectively. The other nodes may include one or more nodes adjacent to a corresponding node. For example, the data transmission unit 150 included in the first node 100 may transmit the corrected block data to one or more of the second node 200 to the fourth node 400. The data transmission unit 250 included in the second node 200 may transmit the corrected block data to one or more of the first node 100, the third node 300, and the fourth node 400. The data transmission unit 350 included in the third node 300 may transmit the corrected block data to one or more of the first node 100, the second node 200, and the fourth node 400. The data transmission unit 450 included in the fourth node 400 may transmit the corrected block data to one or more of the first node 100 to the third node 300.

As a selective embodiment, when new block data is generated due to a specific operation of a corresponding node, each of the first node 100 to the fourth node 400 may combine the new block data with the previously stored block data, encrypt and store the combined block data, and transmit the stored block data to other nodes. Each of the data verification units 120, 220, 320, and 420 may check tag information of the block data and verify whether the block data is new block data. When the block data is the new block data, the data correction units 130, 230, 330, and 430 may combine the new block data with the block data previously stored in the data storage units 140, 240, 340, and 440, encrypt the combined block data, generate corrected block data, and store the corrected block data again in the data storage units 140, 240, 340, and 440, respectively.

As a selective embodiment, when different block data are received for a specific vehicle, each of the first node 100 to the fourth node 400 may select block data on which more operations have been performed and delete the remaining block data.

Figure 2:
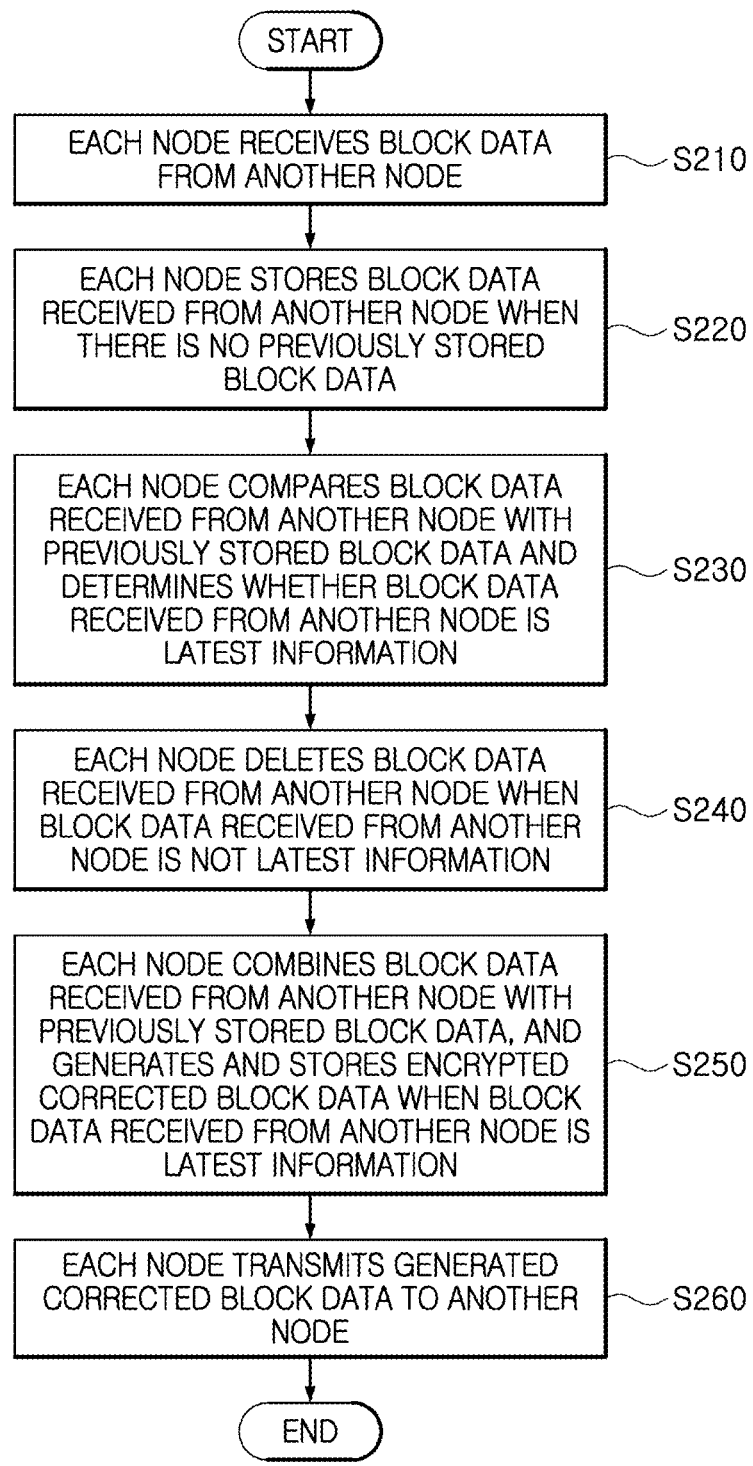
FIG. 2 is a flowchart for explaining a method for securely updating binary data in a vehicle in accordance with an embodiment of the present disclosure.

FIG. 2 is a flowchart for explaining a method for securely updating binary data in a vehicle in accordance with an embodiment of the present disclosure. In the following description, a description of parts overlapping the description of FIG. 1 will be omitted. In the present embodiment, each of the first node 100 to the fourth node 400 as a vehicle may transmit/receive block data, which is obtained by encrypting binary data in the vehicle with a blockchain to/from each other through the wireless network 500. Furthermore, any one of the first node 100 to the fourth node 400 may be an initial information provider that transmits initial block data, which is obtained by encrypting initial binary data in a blockchain manner, to another node when the vehicle is shipped.

Referring to FIG. 2, in step S210, each of the first node 100 to the fourth node 400 receive block data from other nodes. The other nodes may include one or more nodes adjacent to a corresponding node. For example, the first node 100 may receive block data from one or more of the second node 200 to the fourth node 400, and the second node 200 may receive block data from one or more of the first node 100, the third node 300, and the fourth node 400. The third node 300 may receive block data from one or more of the first node 100, the second node 200, and the fourth node 400, and the fourth node 400 may receive block data from one or more of the first node 100 to the third node 300.

In step S220, as a selective embodiment, when there is no previously stored block data, that is, when block data is first received from the other nodes, each of the first node 100 to the fourth node 400 store the block data received from the other nodes.

In step S230, each of the first node 100 to the fourth node 400 compare the block data received from the other nodes with previously stored block data and determine whether the block data received from the other nodes is the latest information. The first node 100 to the fourth node 400 compare tag information (for example, hash tag values) of the block data received from the other nodes with tag information of the block data previously stored in the data storage units 140, 240, 340, and 440, respectively. When there is a change in the tag information, each of the first node 100 to the fourth node 400 may determine that the block data received from the other nodes is the latest information, and when there is no change in the tag information, each of the first node 100 to the fourth node 400 may determine that the block data received from the other nodes is not the latest information.

In step S240, when the block data received from the other nodes is not the latest information, each of the first node 100 to the fourth node 400 deletes the block data received from the other nodes.

In step S250, when the block data received from the other nodes is the latest information, the first node 100 to the fourth node 400 combines the block data received from the other nodes with the previously stored block data, and generates and store encrypted corrected block data.

In step S260, each of the first node 100 to the fourth node 400 may transmit the stored corrected block data to other nodes. The other nodes may include one or more nodes adjacent to a corresponding node. For example, the first node 100 may transmit the corrected block data to one or more of the second node 200 to the fourth node 400, and the second node 200 may transmit the corrected block data to one or more of the first node 100, third node 300, and the fourth node 400. The third node 300 may transmit the corrected block data to one or more of the first node 100, the second node 200, and the fourth node 400, and the fourth node 400 may transmit the corrected block data to one or more of the first node 100 to the third node 300.

As a selective embodiment, when new block data is generated due to a specific operation of a corresponding node, each of the first node 100 to the fourth node 400 may combine the new block data with the previously stored block data, encrypt and store the combined block data, and transmit the stored block data to other nodes.

As a selective embodiment, when different block data are received for a specific vehicle, each of the first node 100 to the fourth node 400 may select block data on which more operations have been performed and delete the remaining block data.

The embodiment of the present disclosure described above may be implemented in the form of a computer program executable through various components on a computer, and the computer program may be recorded on a computer readable medium. The medium may include a magnetic medium such as a hard disk, a floppy disk, and a magnetic tape, an optical recording medium such as a CD-ROM and a DVD, a magneto-optical medium such as a floptical disk, and a hardware device, such as a ROM, a RAM, and a flash memory, which is specially configured to store and execute program instructions.

Meanwhile, the computer program may be specially designed and configured for the present disclosure or may be publicly known to and available by those skilled in a computer software field. An example of the computer program may include not only machine language codes generated by a compiler, but also high-level language codes executable by a computer using an interpreter and the like.

In the specification (particularly, in the claims) of the present disclosure, the use of the term "the" and an indication term similar thereto may correspond to both the singular and the plural. Furthermore, in the present disclosure, when a range is described, it includes the disclosure employing individual values belonging to the range (unless otherwise defined) and is the same as describing each individual value constituting the range in the detailed description of the disclosure.

When an order is clearly stated for steps constituting the method in accordance with the present disclosure or there is no contrary description, the steps may be executed in a suitable order. The present disclosure is not necessarily limited to the description order of the steps. In the present disclosure, the use of all examples or exemplary terms (for example, and the like) is just for specifically describing the present disclosure, and the scope of the present disclosure is not limited by the examples or exemplary terms unless limited by the claims. Furthermore, those skilled in the art may recognize that various modifications, combinations, and changes may be made depending on design conditions and factors within the scope of the appended claims or equivalents thereto.

Accordingly, the spirit of the present disclosure should not be limited to the aforementioned embodiment and not only the claims to be described later but also all ranges equivalent to the claims or equivalently changed from the claims fall within the spirit of the scope of the present disclosure.

What is claimed is:

1. An apparatus for securely updating block data in a vehicle, comprising:
 a plurality of nodes as vehicles, wherein each of the plurality of nodes is configured to:
  receive block data from another node;
  compare a first hash tag value of the block data received from the another node with a second hash tag value of a previously stored block data;
  responsive to determining that there is a change between the first hash tag value and the second hash tag value, combine the block data received from the another node with the previously stored block data to generate corrected block data;

store the corrected block data;

transmit the corrected block data to another node; and combine a new block data generated due to a specific operation with the previously stored block data, store the combined block data, and transmit the combined block data to an adjacent node of the plurality of nodes; and the adjacent node of the plurality of nodes is configured to: (i) delete the combined block data received from the any one of the plurality of nodes when the received combined block data is older than the previously stored block data, or (ii) combine the combined block data received from the any one of the plurality of nodes with the previously stored block data to generate a second combined block data, store the second combined block data, and transmits the second combined block data to an adjacent node when the received combined block data is newer than the previously stored block data.

2. The apparatus according to claim 1, wherein any one of the plurality of nodes is an initial information provider that transmits an initial block data to the another node when the vehicle is shipped.

3. The apparatus according to claim 1, wherein, as a result of the comparison, when the block data received from the another node is older than the previously stored block data, each node of the plurality of nodes is configured to delete the block data received from the another node, and when the block data received from the another node is newer than the previously stored block data, each node of the plurality of nodes is configured to combine the block data received from the another node with the previously stored block data.

4. The apparatus according to claim 1, wherein each of the plurality of nodes determines whether the block data received from the another node is up to date by comparing a hash tag value of the block data received from the another node with a hash tag value of the previously stored block data.

5. A method for securely updating block data in a vehicle, comprising:

receiving block data from another node;

comparing a first hash tag value of the block data received from the another node with a second hash tag value of a previously stored block data;

responsive to determining that there is a change between the first hash tag value and the second hash tag value, combining the block data received from the another node with the previously stored block data to generate corrected block data;

storing the corrected block data;

transmitting the corrected block data to another node;

combining, by any one of a plurality of nodes, new block data generated due to a specific operation with the previously stored block data, storing the combined block data, and transmitting the combined block data to an adjacent node; and deleting, by the adjacent node of the plurality of nodes, the combined block data received from the any one of the plurality of nodes when the received combined block data is older than the previously stored block data, or combining, by the adjacent node of the plurality of nodes, the combined block data received from the any one of the plurality of nodes with the previously stored block data to generate a second combined block data, storing the second combined block data, and transmitting the second combined block data to an adjacent node when the received combined block data is newer than the previously stored block data.

6. The method according to claim 5, further comprising:

transmitting, by any one node as an initial information provider among a plurality of nodes, an initial block data to the another node when the vehicle is shipped.

7. The method according to claim 5, wherein, in deleting the block data received from the another node or combining the block data received from the another node with the previously stored block data and encrypting the combined block data to generate corrected block data, as a result of the comparison, when the block data received from the another node is older than the previously stored block data, deleting the block data received from the another node, and when the block data received from the another node is newer than the previously stored block data, combining the block data received from the another node with the previously stored block data.

8. The method according to claim 5, wherein comparing the block data received from the another node with previously stored block data further comprises:

whether the block data received from the another node is up to date by comparing a hash tag value of the block data received from the another node with a hash tag value of the previously stored block data.

\* \* \* \* \*